United States Patent
Jacobson et al.

(10) Patent No.: US 7,468,120 B2
(45) Date of Patent: Dec. 23, 2008

(54) FLUORINE SEPARATION AND GENERATION DEVICE

(75) Inventors: Craig P. Jacobson, Moraga, CA (US); Steven J. Visco, Berkeley, CA (US); Lutgard C. De Jonghe, Lafayette, CA (US); Constantin I. Stefan, Hayward, CA (US)

(73) Assignee: The Regents of the University of California, Oakland, CA (US)

( * ) Notice: Subject to any disclaimer, the term of this patent is extended or adjusted under 35 U.S.C. 154(b) by 558 days.

(21) Appl. No.: 11/121,272

(22) Filed: May 2, 2005

(65) Prior Publication Data
US 2005/0263405 A1    Dec. 1, 2005

Related U.S. Application Data

(63) Continuation of application No. 10/678,428, filed on Oct. 3, 2003, now Pat. No. 7,090,752.

(60) Provisional application No. 60/416,309, filed on Oct. 4, 2002.

(51) Int. Cl.
C25B 13/04   (2006.01)
C25B 9/00    (2006.01)
C25B 1/24    (2006.01)

(52) U.S. Cl. .................................... 204/252

(58) Field of Classification Search .............. None
See application file for complete search history.

(56) References Cited

U.S. PATENT DOCUMENTS

| | | |
|---|---|---|
| 3,860,504 A | 1/1975 | Kaudewitz et al. |
| 4,699,806 A | 10/1987 | Fait et al. |
| 4,707,224 A | 11/1987 | Shabrang |
| 4,851,303 A | 7/1989 | Madou et al. |
| 5,035,962 A | 7/1991 | Jensen |
| 5,160,618 A | 11/1992 | Burggraaf et al. |
| 5,169,811 A | 12/1992 | Cipollini et al. |
| 5,219,673 A | 6/1993 | Kaun |
| 5,240,480 A | 8/1993 | Thorogood et al. |
| 5,286,322 A | 2/1994 | Armstrong et al. |
| 5,290,406 A | 3/1994 | Sawamoto et al. |
| 5,314,765 A | 5/1994 | Bates |
| 5,328,779 A | 7/1994 | Tannenberger et al. |
| 5,338,625 A | 8/1994 | Bates et al. |
| 5,342,705 A | 8/1994 | Minh et al. |
| 5,342,710 A | 8/1994 | Koksbang |
| 5,356,730 A | 10/1994 | Minh et al. |
| 5,366,770 A | 11/1994 | Wang |
| 5,455,126 A | 10/1995 | Bates et al. |
| 5,480,739 A | 1/1996 | Kawasaki et al. |
| 5,512,147 A | 4/1996 | Bates et al. |
| 5,532,071 A | 7/1996 | Pal et al. |
| 5,538,814 A | 7/1996 | Kamauchi et al. |

(Continued)

FOREIGN PATENT DOCUMENTS

EP    0 111 214    1/1988

(Continued)

*Primary Examiner*—Harry D Wilkins, III
(74) *Attorney, Agent, or Firm*—Fulbright & Jaworski L.L.P.

(57) ABSTRACT

A process and apparatus for the electrolytic separation of fluorine from a mixture of gases is disclosed. Also described is the process and apparatus for the generation of fluorine from fluorine/fluoride containing solids, liquids or gases.

12 Claims, 5 Drawing Sheets

U.S. PATENT DOCUMENTS

| | | |
|---|---|---|
| 5,565,180 A | 10/1996 | Spink |
| 5,567,210 A | 10/1996 | Bates et al. |
| 5,569,520 A | 10/1996 | Bates |
| 5,589,017 A | 12/1996 | Minh |
| 5,589,285 A | 12/1996 | Cable et al. |
| 5,597,660 A | 1/1997 | Bates et al. |
| 5,612,152 A | 3/1997 | Bates |
| 5,618,405 A | 4/1997 | Winnick |
| 5,648,487 A | 7/1997 | Beriger et al. |
| 5,649,996 A | 7/1997 | Soffer et al. |
| 5,670,270 A | 9/1997 | Wallin |
| 5,677,074 A | 10/1997 | Serpico et al. |
| 5,686,201 A | 11/1997 | Chu |
| 5,688,384 A | 11/1997 | Hodgson et al. |
| 5,725,965 A | 3/1998 | Wachsman et al. |
| 5,779,866 A | 7/1998 | Tarancon |
| 5,788,788 A | 8/1998 | Minh |
| 5,795,653 A | 8/1998 | Cuomo et al. |
| 5,814,420 A | 9/1998 | Chu |
| 5,820,655 A | 10/1998 | Gottzmann et al. |
| 5,824,434 A | 10/1998 | Kawakami et al. |
| 5,840,174 A | 11/1998 | Lehmann et al. |
| 5,882,809 A | 3/1999 | McPheeters et al. |
| 5,914,434 A | 6/1999 | Soffer et al. |
| 5,932,368 A | 8/1999 | Batawi et al. |
| 5,938,822 A | 8/1999 | Chen et al. |
| 5,961,813 A | 10/1999 | Gestermann et al. |
| 5,985,476 A | 11/1999 | Wachsman et al. |
| 5,993,985 A | 11/1999 | Borglum |
| 5,993,986 A | 11/1999 | Wallin et al. |
| 6,025,094 A | 2/2000 | Visco et al. |
| 6,030,591 A | 2/2000 | Tom et al. |
| 6,051,173 A | 4/2000 | Fasano et al. |
| 6,051,330 A | 4/2000 | Fasano et al. |
| 6,071,401 A | 6/2000 | Engel et al. |
| 6,079,426 A | 6/2000 | Subrahmanyam et al. |
| 6,183,623 B1 | 2/2001 | Cisar et al. |
| 6,223,685 B1 | 5/2001 | Gupta et al. |
| 6,228,520 B1 | 5/2001 | Chaio |
| 6,270,714 B1 | 8/2001 | Azran et al. |
| 6,352,676 B1 | 3/2002 | Hsiung et al. |
| 6,358,485 B1 | 3/2002 | Baker |
| 6,358,567 B2 | 3/2002 | Pham et al. |
| 6,368,383 B1 | 4/2002 | Virkar et al. |
| 6,374,831 B1 | 4/2002 | Chandran et al. |
| 6,403,047 B1 | 6/2002 | Norton et al. |
| 6,432,256 B1 | 8/2002 | Raoux |
| 6,458,170 B1 | 10/2002 | Visco et al. |
| 6,468,490 B1 | 10/2002 | Shamouilian et al. |
| 6,500,356 B2 | 12/2002 | Goto et al. |
| 6,514,314 B2 | 2/2003 | Sirman et al. |
| 6,565,632 B1 | 5/2003 | Van Hassel et al. |
| 6,605,316 B1 | 8/2003 | Jacobson |
| 6,613,106 B1 | 9/2003 | Debe et al. |
| 6,767,662 B2 | 7/2004 | Jacobson |
| 6,783,880 B2 | 8/2004 | Christiansen |
| 6,794,075 B2 | 9/2004 | Steele et al. |
| 6,863,019 B2 | 3/2005 | Shamouilian et al. |
| 2002/0062837 A1 | 5/2002 | Miyanaga et al. |
| 2003/0021900 A1 | 1/2003 | Jacobson |
| 2003/0175439 A1 | 9/2003 | Jacobson |
| 2004/0109817 A1 | 6/2004 | Smith et al. |

FOREIGN PATENT DOCUMENTS

| | | |
|---|---|---|
| EP | 0 399 833 A1 | 11/1990 |
| EP | 0 476 808 A1 | 3/1992 |
| EP | 0 497 542 A1 | 8/1992 |
| EP | 0 513 982 A2 | 11/1992 |
| EP | 0 524 013 A1 | 1/1993 |
| FR | 2 627 767 | 9/1989 |
| GB | 346774 | 4/1931 |
| GB | 1 383 343 | 2/1975 |
| WO | WO 97/00734 | 1/1997 |
| WO | WO01/09968 A1 * | 2/2001 |

* cited by examiner

FLUORINE SEPARATION AND GENERATION DEVICE

CROSS REFERENCE TO RELATED APPLICATIONS

This application is a continuation of and claims priority to U.S. Ser. No. 10/678,428, filed Oct. 3, 2003, now U.S. Pat. No. 7,090,752, which claims priority to application Ser. No. 60/416,309, filed Oct. 4, 2002, and the contents of both applications are hereby incorporated by reference in their entirety.

STATEMENT REGARDING FEDERALLY SPONSORED RESEARCH OR DEVELOPMENT

This invention was made with government support under Grant (Contract) No. DE-AC03-76F00098 awarded by The United States Department of Energy. The government has certain rights to this invention.

BACKGROUND OF THE INVENTION

The present invention relates generally to the field of fluorine separation and fluorine generation devices, and more particularly to a novel electrolytic device having unusual and unexpected electrochemical performance.

The semiconductor industry makes extensive use of gas mixtures that contain fluorine. Many of these substances are harmful and expensive, and must therefore be removed or scrubbed from the exhaust gas stream. Accordingly a need exists for a device and method to separate fluorine from gas mixtures, and to generate the fluorine needed for the industry.

There are several approaches to separate fluorine ($F_2$) from other gases, including cryogenic distillation, permeation membranes, and electrolytic separation. Electrolytic separation offers the potential advantages of producing high purity fluorine at room temperature at high flux in a compact unit. Methods are known for the electrochemical separation of gas mixtures. One technique, described in U.S. Pat. No. 5,618,405 teaches the separation of halides from high temperature gas mixtures using an electrochemical cell, the contents of which are hereby incorporated by reference in its entirety. Another technique known as the "outer-cell" method the gaseous component of a waste gas to be stripped are first absorbed in an absorption column in a wash solution; then the wash solution containing the polluting component is cathodically reduced or anodically oxidized in a connected electrolysis cell. This arrangement requires two different devices, namely one for the absorption and one for the electrolysis. Another technique is the "inner-cell" method in which absorption and electrochemical conversion take place in an electrolysis cell, and because the concentration of pollutants is always kept low by electrochemical conversion. Yet another method is the "indirect" electrolysis processes where the oxidizing or reducing agent used in a wet-chemical waste-gas treatment is regenerated by electrolysis of the wash solution used.

U.S. Pat. Nos. 6,071,401 and 5,840,174, the contents of which are incorporated herein by reference in their entirety disclose an electrolysis cell with a fixed-bed electrode for the purification of waste gases. In reductive purification hydrogen is supplied to the gas diffusion electrode and in oxidative purification oxygen is used.

U.S. Pat. No. 6,030,591, the contents of which are incorporated herein by reference in their entirety discloses the separation of fluorocompounds by cryogenic processing, membrane separation and/or adsorption.

U.S. Pat. Nos. 6,514,314 and 5,820,655, the contents of which are incorporated herein by reference in their entirety disclose a ceramic membrane structure an oxygen separation method.

One disadvantage of the inner cell method is the high residual content of impurities in the purified gas. In the case of chlorine the residual content is approximately a factor of ten above the limit value of 5 ppm. In general, the purity of gases generated by solid state devices is much higher than that of liquid (or melt) containing cells.

Another disadvantage of the prior art methods is the fact that the apparatus comprising an electrolysis cell requires two liquid circuits, namely a cathode circuit and an anode circuit, as a result of which the device is rendered complicated and trouble-prone.

Solid-state electrochemical devices are often implemented as cells including two porous electrodes, the anode and the cathode, and a dense solid electrolyte and/or membrane, which separate the electrodes. For the purposes of this application, unless otherwise explicit or clear from the context in which it is used, the term "electrolyte" should be understood to include solid oxide membranes used in electrochemical devices, whether or not potential is applied or developed across them during operation of the device. In many implementations the solid membrane is an electrolyte composed of a material capable of conducting ionic species, such as fluorine ions, yet has a low electronic conductivity. In other implementations, such as gas separation devices, the solid membrane may be composed of a mixed ionic electronic conducting material ("MIEC"). In each case, the electrolyte/membrane must be dense and as pinhole free as possible ("gas-tight") to prevent mixing of the electrochemical reactants. In all of these devices a lower total internal resistance of the cell improves performance.

Solid-state electrochemical devices are typically based on electrochemical cells with ceramic electrodes and electrolytes and have two basic designs: tubular and planar. Tubular designs have traditionally been more easily implemented than planar designs, and thus have been proposed for commercial applications. However, tubular designs provide less power density than planar designs due to their inherently relatively long current path that results in substantial resistive power loss. Planar designs are theoretically more efficient than tubular designs, but are generally recognized as having significant safety and reliability issues due to the complexity of sealing and manifolding a planar stack.

SUMMARY OF THE INVENTION

The present invention describes an electrolytic cell for the electrolytic removal of fluorine from gas mixtures. Another object of the present invention is the separation of fluorine from fluorine/fluoride containing sources (gases, liquids or solids), such as HF, $NF_3$, $CF_4$, $SF_6$, etc. The present invention describes the electrolytic cell to accomplish the aforementioned and novel methods for making improved cells over the prior art. These and other features and advantages of the present invention will be presented in more detail in the following specification of the invention and the accompanying figures, which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE PREFERRED EMBODIMENTS

Reference will now be made in detail to some specific embodiments of the invention. Some examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

An overview of solid-state device components and construction follows. This description is provided both by way of background and introduction to the subject, and to provide design and fabrication details that may be adopted in compositions, devices, and methods in accordance with the present invention.

Figure 1:
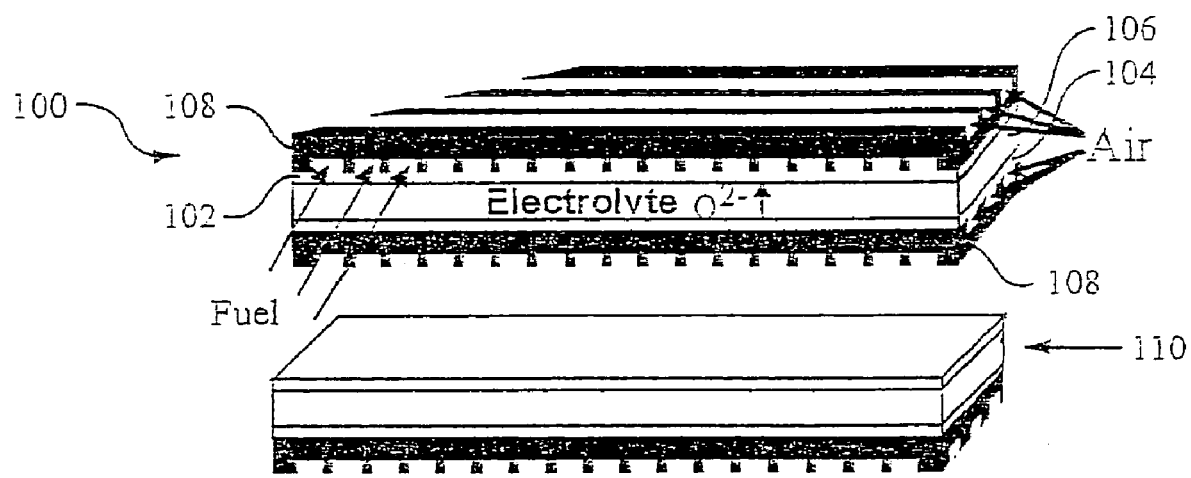
FIG. 1 depicts a planar design solid state electrochemical device of the prior art.

While the designs depicted and described in FIG. 1 is intended for use as a solid oxide fuel cell (SOFC) the same or a similar device designs is also used for fluorine separation is useful depending on the selection of materials used as the electrodes and separators, the environment in which the device is operated (gases supplied at each electrode), pressures or electrical potentials applied, and the operation of the device. For example, as described above, for a fuel cell, a hydrogen-based fuel (typically methane that is reformed to hydrogen during operation of the device) is provided at the fuel electrode and air is provided at the air electrode. Oxygen ions ($O^{2-}$) formed at the air electrode/electrolyte interface migrate through the electrolyte and react with the hydrogen at the fuel electrode/electrolyte interface to form water, thereby releasing electrical energy that is collected by the interconnect/current collector.

FIG. 1 illustrates a basic planar design for a solid-state electrochemical device, for example, a solid oxide fuel cell (SOFC). The cell 100 includes an anode 102 (the "fuel electrode") and a cathode 104 (the "air electrode") and a solid electrolyte 106 separating the two electrodes. In conventional SOFCs, the electrodes and electrolytes are typically formed from ceramic materials, since ceramics are able to withstand the high temperatures at which the devices are operated. For example, SOFCs are conventionally operated at about 950° C. This operating temperature is determined by a number of factors, in particular, the temperature required for the reformation of methane to produce hydrogen and reaction efficiency considerations. Also, typical solid-state ionic devices such as SOFCs have a structural element onto which the SOFC is built. In conventional planar SOFCs the structural element is a thick solid electrolyte plate; the porous electrodes are then screen-printed onto the electrolyte. The porous electrodes are of low strength and are not highly conductive. Alternatively, a thick porous electrode and a thin electrolyte membrane can be co-fired, yielding an electrode/electrolyte bilayer.

Another consideration governing the temperature at which the solid-state electrochemical device described herein is operated is the electrolyte/membrane conductivity. Conventional devices must be operated at a high enough temperature to make the ceramic electrolyte sufficiently ionically conductive for the energy producing reactions (in the case of a SOFC; other reactions for gas separators or generators).

Typical devices described in accordance with the present invention operate at temperatures of approximately 120° C., but that temperature ranges from between 100-300° C., and preferably between 120-150° C., depending partially upon the choice of electrolyte. For the preferred electrolyte of $PbSnF_4$, the operating temperature is about 120° C. For another electrolyte, such as $LaF_3$ the temperature is between 300-500° C., because of the conductivity of the $LaF_3$. If the electrolytic cell is run at a temperature of less than 150° C., a teflon or teflon based material may be used in the device, for seals and the like.

Methods exist for forming thin electrolytes on substrates, such as EVD/CVD. However, EVD/CVD is a complex and expensive technique, and the ceramic-based devices to which the technique has been applied still require high operating temperatures to be at all efficient. Unfortunately, most metals are not stable at this temperature in an oxidizing environment and very quickly become converted to brittle oxides. The present invention contemplates sputtering as a method of forming thin film electrolytes on substrates. Sputtering contemplated by this method is taught in the art, see for instance P. Hagenmuller, A. Levasseur, C. Lucat, J. M. Reau, and G. Villeneuve, in "Fast ion transport in solids. Electrodes and electrolytes. North-Holland. 1979, pp. 637-42. Amsterdam, Netherlands." (P. Vashishta, J. N. Mundy, and G. K. Shenoy, eds.), 1979, the contents of which are hereby incorporated by reference in its entirety. Films made using this method generally will be thin, less than about 1 micron.

This invention contemplates a preferred method for making electrolyte film having a thickness of between 10-50 microns by melting as described below in Example 1.

Referring again to FIG. 1, the cell 100 is depicted in the form in which it could be stacked with other like cells 110, as it typically would be to increase the capacity of the device. This embodiment is contemplated in the present invention. To be stacked, the cells require bipolar interconnects 108 adjacent to each electrode that are electrically, but not ionically, conductive, in the present invention. In the present invention, the interconnects 108 allow current generated in the cells to flow between cells and be collected for use. These interconnects are typically formed into manifolds through which the source gas and carrier gas may be supplied to the respective electrodes (allow lateral movement of gas in channels; but not allow intermixing of gas (vertical movement). Due to the corrosive nature of $F_2$, materials for the interconnect must be corrosion resistant. Teflon and teflon based materials are contemplated. The interconnect may also be a $F_2$ corrosion resistant materials such as Ni or a Ni alloy, or, preferably, stainless steel. Electrically conductive interconnects in the present invention may be used to separate the anode and cathode chambers and to apply current to the electrodes. Aluminum and aluminum alloys may be used if the device of the present invention is to be operated at or below 300° C. The choice of interconnect material is readily determinable by one of ordinary skill depending on the temperatures of use.

The electrode materials may be different between cathode and anode. Preferably, the anode material should have a low overpotential for electrochemical fluorine generation, and the cathode should have a high overpotential for electrolyte reduction, i.e. electrodeposition of Pb and Sn, if $PbSnF_4$ is used. Pt is most preferred for the anode, and graphite the most preferred for the cathode. The overpotential is the applied potential less the initial or equilibrium potential and the IR drop on the electrolyte. In operation the reference electrode may not be necessary, and one having skill in the art will be able to optimize the overpotential for any particular electrolyte. This value will enable operation of the device inside the potential range or stability window for the particular electrolyte chosen. Of course, one of ordinary skill will readily appreciate that operating the device at too high a potential will create to much current and destroy the electrolyte. The present invention contemplates that a device operating with a $PbSnF_4$ electrolyte and $Sn/SnF_2$ reference electrodes, the window would be approximately 0 to about 5-6 volts, vs $Sn/SnF_2$ reference.

The electrodes (anode and cathode) used in accordance with the fluorine generation or separation device described herein are preferably materials which do not produce highly volatile or electrically insulating fluorides in and under the electrical potentials applied to the device. Importantly, electrode materials must be chosen that do not have adverse reactions with the thin-film electrolyte. Non-limiting examples are metals such as platinum, gold, nickel, palladium, copper, silver, alloys of these metals, and graphitic carbon. A preferred material for the cathode is carbon, preferably graphitic carbon. A preferred material for the anode is Pt. One having skill in the art will appreciate that the anode and cathode may both be of the same material, depending on the choice of electrolyte.

In a preferred embodiment of the electrode, there is contemplated a triple phase boundry with a high surface area of the electrolyte material, the electrode material and the gas being used in the gas separation or generation device. This is accomplished by providing small particles (high surface area) of Pt powder, i.e. Pt black (0.05 microns to 20 microns, preferably 0.7 microns to 2 microns) and pressing at 1000 psi. During operation, all three phases are interpenetrating, resulting in three phase boundaries throughout.

In another embodiment of the present invention there is contemplated a carbon electrode. This may be prepared from petroleum cokes containing coal tar pitch as binder. Preferably the carbon anode is formed with 40 wt % of coal tar pitch as a binder, which will lead to the increase in the effective internal surface due to the proper size and distribution of pores on the carbon anode. Similar anodes are known in the art and described in Ahn et al. Journal of the Korean Chemical Society, 2001, Vol. 45, No. 5, the contents of which are hereby incorporated by reference in its entirety for all purposes.

In order to separate fluorine efficiently from impurity gases by electrolysis, it is preferable to have a dense membrane that is conductive to fluoride ion, with reasonably high ionic conductivity at ambient or slightly elevated temperatures. Such materials are known. Two non-limiting examples are $PbSnF_4$ and $LaF_3$, which both have high ionic conductivity for fluoride ion. The ionic conductivity of $PbSnF_4$ is about $10^{-3}$ $\Omega^{-1}$ $cm^{-1}$ at room temperature; therefore resistivity ($\rho$) is $10^3$ $\Omega$cm at room temperature. Using the relationship R=$\rho$(length/Area), then R=1000 (length/1 $cm^2$). For a $PbSnF_4$ plate of 1 mm thickness, Area Specific Resistance (R·Area)=100 $\Omega cm^2$; if we decrease the thickness of the electrolyte to 10 microns, then ASR=1 $\Omega cm^2$ at room temperature. This means that in a device run at a current density of 1 amp/$cm^2$, the electrolyte resistance will only contribute 1 volt in iR loss at room temperature. There are also other fluoride ion conductors such as $LaF_3$, which has an ionic conductivity of $LaF_3$ is $5\times10^{-5}$ S/cm at 20° C.

Figure 2:
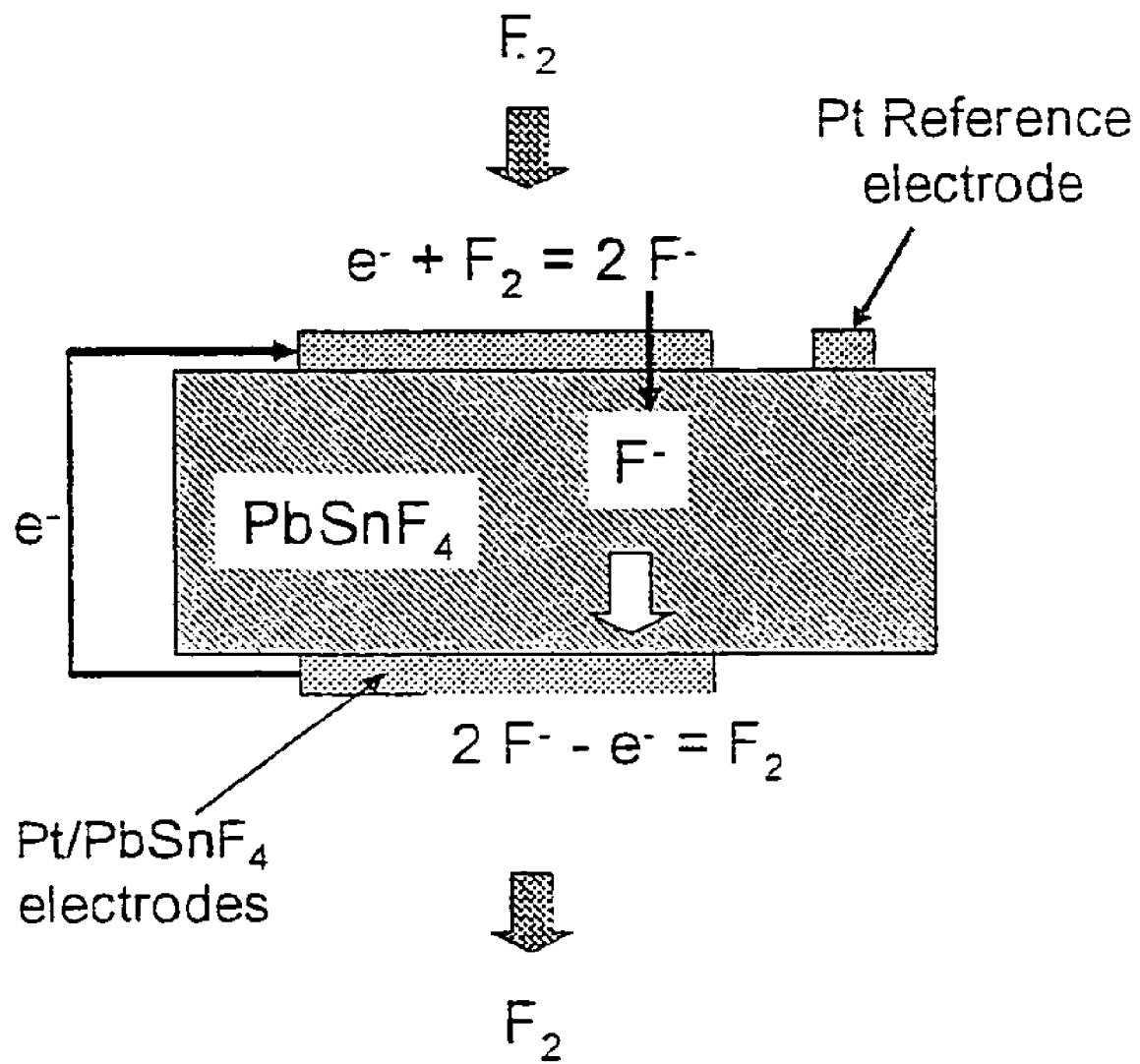
FIG. 2 depicts a fluorine separation device in accordance with one embodiment of the present invention.

The overpotential of the $F_2/F^-$ electrodes as a function of current density is important. In one embodiment of the present invention there is used use carbon-based electrodes as is done for HF oxidation, however, those electrodes are known to become passivated giving rise to large overpotentials. Recently, Groult et al. showed this to be due to the formation of $CF_x$ on the carbon electrode surface which inhibits wetting of the electrode, see H. Groult, D. Devilliers, S. Durand-Vidal, F. Nicolas, and M. Combest, *Electrochimica Acta*, 44, 2793 (1999), the contents of which are incorporated herein by reference. The present invention is not particularly concerned with wetting of a carbon electrode with molten KF—HF, so this phenomenon may not be an issue for redox of $F_2$ mixed with impurity gases. Pletcher showed that the overpotentials for the $F_2/F^-$ redox reaction are much lower on Pt electrodes than on carbon, see A. G. Doughty, M. Fleischmann, and D. Pletcher, *Electroanal. Chem. And Interfacial Electrochem.*, 51, 329 (1974), the contents of which are incorporated herein by reference. The current voltage relationship for Pt electrodes are shown in the FIGS. 1 and 2. Given the low overpotential for $F_2$ evolution, very low overpotentials for porous Pt electrodes having high surface area are possible.

In one embodiment (FIG. 2) the present invention contemplates a thick $PbSnF_4$ disk (0.1-2.5 mm, preferably 1-2 mm thick) coated with thin (50 microns) Pt/$PbSnF_4$ composite electrodes. The invention contemplates that the electrode thickness may be 2 microns to 100 microns, preferably between 10 and 50 microns. A Pt reference electrode can be used to monitor anode and cathode overpotentials.

Figure 3:
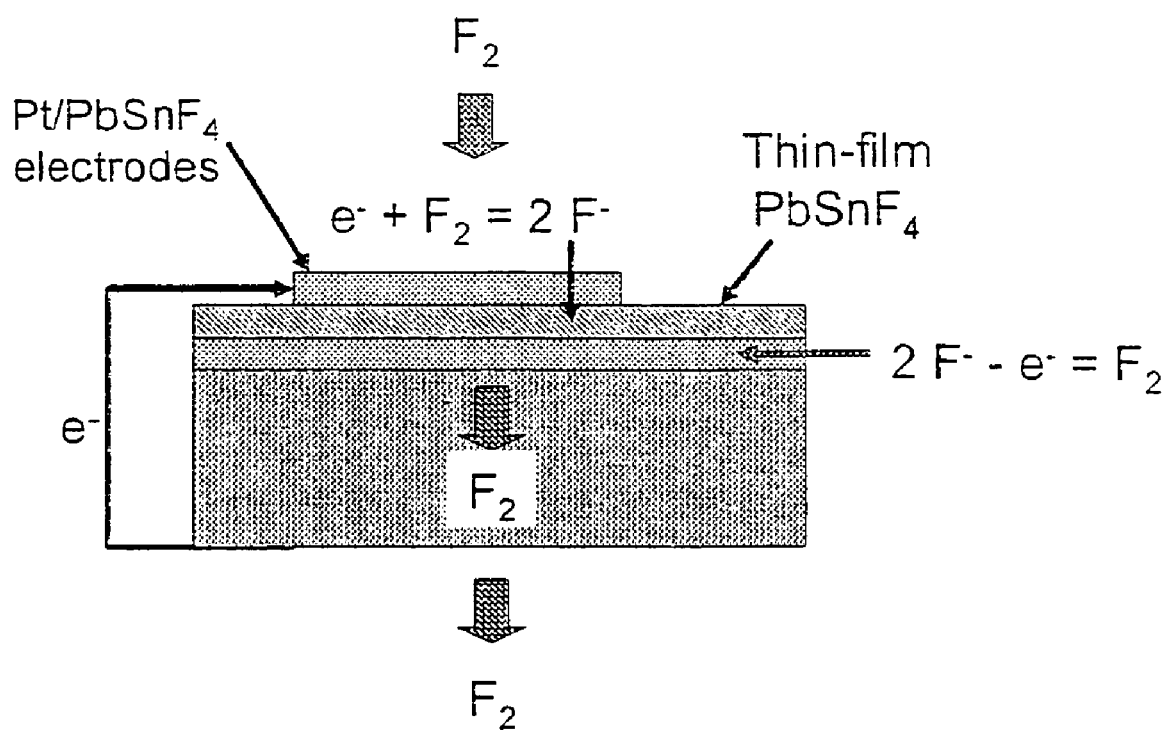
FIG. 3 depicts a fluorine separation device in accordance with one embodiment of the present invention
Figure 4:
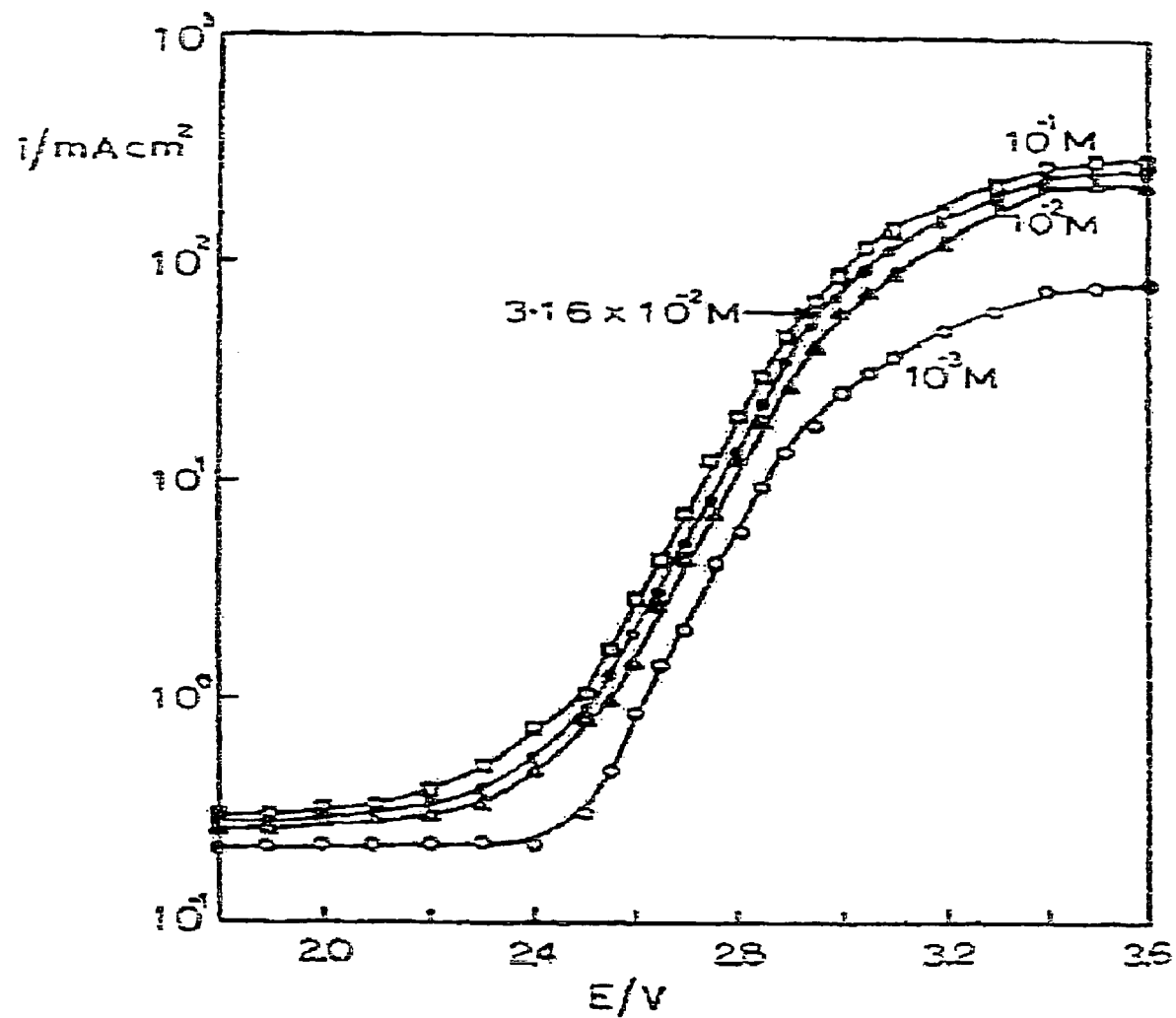
FIG. 4 shows the curent/voltage relationship for Pt electrodes.
Figure 5:
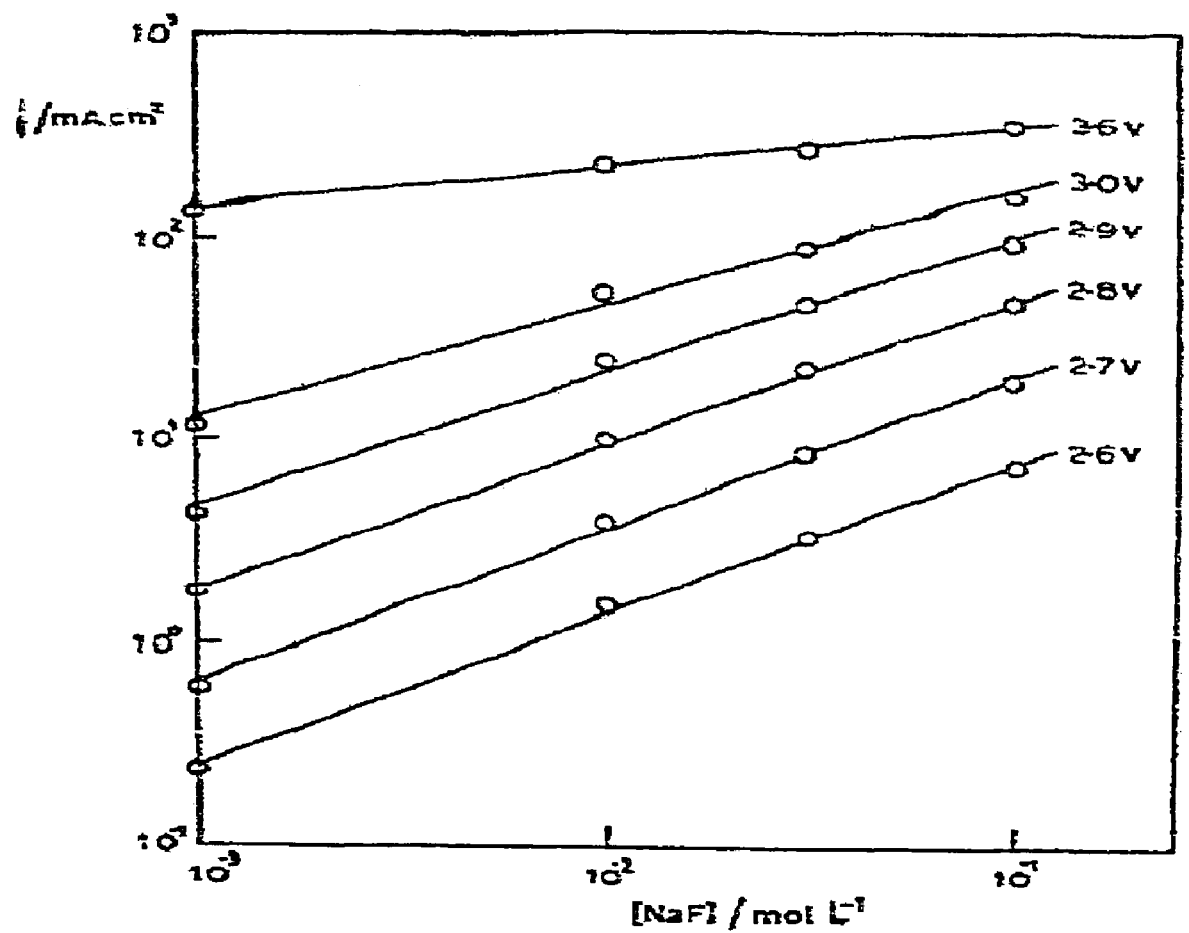
FIG. 5 shows the current/voltage relationship for Pt electrodes.

In another more preferred embodiment, the fluorine separation and generation device contemplates the structure shown in FIG. 3. Here the thickness of the electrolyte is minimized to eliminate iR losses, and the membrane is supported on a conductive substrate. Preferably, the substrate will be a stainless steel porous support onto which a Pt/$PbSnF_4$ slurry is deposited followed by deposition of a dense $PbSnF_4$ film (2-200 µm, preferably ~10-20 µm) onto which the second Pt/$PbSnF_4$ electrode is deposited. The invention contemplates that the fluorine separation device is functional when fabricated in flat plates (smaller footprint device), or a tubular shape (simplified seals). One having ordinary skill will appreciate that other shapes are possible without altering the nature of the invention.

Methods for making the fluorine separation device of the present invention are known in the art. The present invention also contemplates novel techniques, which produce electrode/electrolyte interfaces having unexpected superior properties. U.S. Pat. No. 6,605,316, by inventors of the present invention describes the structure and fabrication techniques for solid state electrochemical devices, the contents of which are incorporated herein by reference. Other pending published applications by the inventors of the present invention describe techniques suitable for constructing the electrochemical device described herein. U.S. Published application No. 2003-0021900 A1 describes a method of making crack free dense films; U.S. Published application No. 2003 0175439 A1 describes processes for making electrolytic dense films; U.S. Published application No. 2002-0081762 A1 describes electrolytic structures and processes for making. The contents of the above patents and applications are hereby incorporated herein by reference for all purposes. Additionally, membrane electrode assemblies useful for the electrolyzers of the present invention are disclosed in U.S. Pat. No. 6,613,106, the contents of which are incorporated herein by reference in their entirety.

The electrolyte membrane of the present invention comprises a material capable of conducting fluorine. The material must be a solid, and not be porous such that there is no gas movement through the membrane. The electrolyte must be gas tight. Preferably the material is $PbSnF_4$. The $PbF_2/SnF_2$ system is very rich in new materials. These include a wide $Pb_{1-x}Sn_xF_2$ solid solution (0.x.0.50, cubic.-$PbF_2$ fluorite-type for 0.x.0.30, tetragonal.-$PbSnF_4$ fluorite-type for 0.30<x.0.50) and stoichiometric $Pb_2SnF_6$, $PbSnF_4$ and $PbSn_4F_{10}$. In addition, all the stoichiometric compounds undergo phase transitions on heating. These phases are also very high performance fluoride-ion conductors, the best among all fluoride ion conductors, with $PbSnF_4$ being the very best. Ball-milling has been extensively used for oxides and other strong lattices, and it is usually found to lead slowly to amorphization. Ball-milling has also been used to supply the energy required to perform solid state reactions. Surprisingly, the phase transition on ball-milling takes place very rapidly (ca. 5 minutes) and no amorphization or further reduction of particle size occurs on further milling (checked up to 1 hour). At small x values, a.-$PbF_2$ like behavior is observed, while for the highest x values, it behaves like.-$PbSnF_4$, with a slowing down of the transformation as x moves towards the center of the solid solution, where no change is observed. The particle size obtained at a given ball-milling time is a function of the fractional amount x of tin in the samples.

Other materials contemplated for the electrolyte are $LaF_3$, doped or undoped with rare earth metals, preferably Er. Other electrolyte materials capable of ionic transfer of fluorine known in the art are also contemplated as useful for this invention.

In one embodiment of the present invention the electrolyte is a ceramic electrolyte which is substantially impermeable to the passage of gases but permeable to fluoride-ions. An example of such an electrolyte and method of making is known in the art. U.S. Pat. No. 4,707,224, the contents of which are hereby incorporated by reference in its entirety for all purposes. An unexpected advantage to the present invention over this patent is that electrodes was made by sputtering and/or evaporation and there is not a triple phase boundry uniformly present, except perhaps in film pinholes and other defects.

Contemplated for the substrate materials for which the structure may be affixed are porous metals such as the transition metals chromium, silver, copper, iron and nickel, or a porous alloy such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5%, and C 0.08%).

In some embodiments of the present invention, the substrate may be a porous cermet incorporating one or more of the transition metals Ni, Cr, Fe, Cu and Ag, or alloys thereof.

A protective layer for either or both electrodes is further contemplated. In addition to providing protection for electrolyte, the protective layer should conduct ions generated during discharge of the negative electrode. The protective layer may be deposited by sputtering or evaporation. Materials for the protective layer may include alkali and alkali earth metal fluorides, such as $CaF_2$, $MgF_2$ or KF. Also, contemplated by this invention and preferred is doped or undoped $LaF_3$. This layer will separate the electrode from the electrolyte. The thickness of the layer is less than 1 micron. These are known in the art and disclosed in U.S. Pat. No. 6,025,094, the contents of which are hereby incorporated in their entirety.

The present invention also contemplates that the solid state electrochemical device described herein is also useful as a fluorine generation device. In this manner, gasses such as HF, $NF_3$, $CF_4$ and $SF_6$ may be electrochemically converted to fluorine gas. The invention contemplates that a mixture of gases may also be used as input gases, to generate fluorine gases. Example 4 describe one embodiment in accordance with this concept. Also contemplated is the use of liquids (nonlimiting examples of which include KF*HF melts) and solids (nonlimiting examples which include KF, $PBF_2$, $CoF_3$) as input materials. In this embodiment the cathode may be different than the cathode for a fluorine separation device dependent on the source of fluorine, but the anode and electrolyte can be as described for the separation device, because the chemistry is the same. Preferred cathode materials for a fluorine generation device are Pt, if one is using as input material $NF_3$, for example. One skilled in the art will be able to choose suitable materials for the cathode material depending on the choice of input material. The choice is based on minimizing the overpotential for the reaction which is the reduction of gases to fluoride ion $F^-$ and a residual gas ($N_2$ in the case of $NF_3$ source gas).

The techniques described herein, and the structures they produce may be used in the fabrication of a variety of electrochemical devices, as described above, to reduce cost, improve performance and reliability, and reduce operating temperature for an efficient device. It should be understood that the fabrication techniques and structures described herein might be implemented in either planar, hexagonal or tubular solid-state electrochemical device designs.

EXAMPLES

The following examples describe and illustrate aspects and features of specific implementations in accordance with the present invention. It should be understood the following is representative only, and that the invention is not limited by the detail set forth in these examples.

Example 1

A thin film electrolyte cell can be prepared by melt solidification. A Pt—$PbSnF_4$ powder mixture is uniformly spread on top of a porous stainless steel support and pressed in a die at 1000 PSI to form a pressed film of 1-20 microns, preferably 5-10 microns. $PbSnF_4$ powder is approximately uniformly spread on the bilayer structure and die pressed at 5000 PSI. The cell is placed in a closed cylinder which can be purged with $F_2$ or $F_2$ in an inert gas (He, Ar or $N_2$) and heated to 390° C., the melting point of $PbSnF_4$. Upon cooling, the electrolyte solidifies to a compact film. The second Pt—$PbSnF_4$ electrode is sprayed on the electrolyte film to a thickness of 1-20 microns, preferably 5-10 microns.

Example 2

An electrolyte supported cell can be prepared by the following method. A saturated aqueous solution of $Pb(NO_3)_2$ is added drop-wise to a saturated aqueous solution of $SnF_2$, acidified by 5% HF, under stirring. The white precipitate formed is filtered by vacuum filtration, and dried in vacuum oven at room temperature overnight. The resulted powder is die pressed uniaxially at 50 KPSI and room temperature for 5 min. The disc resulted has an electrical conductivity of $3 \times 10^{-2}$ S/cm at 100° C., measured by impedance spectroscopy. In a slightly larger die than the diameter of the electrolyte disc, Pt or Pt—$PbSnF_4$ powder mixture, either dry or as a paste in isopropyl alcohol, is spread on both faces of the disc, and pressed at 1000 PSI, to form porous electrodes.

Example 3

Operation of a fluorine separation device in accordance with one embodiment of this invention. With reference to FIG. 3 (optional elements are now shown), a membrane electrode assembly may be sandwiched between two aluminum blocks (not shown), separated by a Teflon sheet (not shown). Here it is understood in FIG. 3, as well as FIG. 2, that "F2" refers to a fluorine/fluoride containing compound, or a gas mixture, containing fluorine gas compound as well as other gases. The anode and cathode chambers can be provided with gas inlets and outlets. Gas tight seals are enabled on each face (not shown) and between blocks by Viton or Kalrez O-rings. Power is applied to the electrodes directly through the Al blocks, from a power source (not shown), either at a constant voltage (potentiostatic mode), or at a constant current (galvanostatic mode). The fluorine source can be $F_2$ in $N_2$, or other $F_2$ containing gas mixtures. Unreacted $F_2$ from the cathode chamber can be neutralized in a scrubber, or can be recirculated for increased efficiency. The anode chamber (not shown) can be purged with an inert carrier gas, or can produce pure $F_2$ if the corresponding mass flow controller is stopped.

Example 4

Operation of a fluorine generation device in accordance with one embodiment of the present invention. The process of operation is similar to that of Example 3, however the cathode material has to be electrochemically active for the reduction of the fluorine precursor. For example, a preferred chemical for storing fluorine is $NF_3$. This can be reduced at the cathode according to the reaction

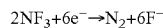

$$2NF_3 + 6e^- \rightarrow N_2 + 6F^-$$

releasing $N_2$ into the exhausted gas and F into the electrolyte. As in previous example, $F^-$ is transported to the anode and oxidized to $F_2$. The cathode material can be a metal such as that used in previous example, preferably Pt powder, most preferably activated Pt (black Pt).

Although the foregoing invention has been described in some detail for purposes of clarity of understanding, those skilled in the art will appreciate that various adaptations and modifications of the just described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A solid state electrolytic device for removing fluorine from a semiconductor exhaust gas, comprising:
   a fast and second electrode, wherein the first electrode is a cathode and the second electrode is an anode;
   a solid electrolyte disposed between the anode and cathode; and,
   a fluid-tight chamber that comprises an inlet and fluid contact with at least one of the electrodes;
   wherein at least one of the cathode or anode comprises an electronic conductor and a fluoride ion conductor thereon, and
   whereby fluorine is removed from a fluorine-containing exhaust gas mixture produced by semiconductor manufacturing, when the exhaust gas is supplied to the gas inlet.

2. The device of claim 1, comprising a power source to apply power to the electrodes.

3. The device of claim 1, comprising means for supplying an electric potential to the electrodes.

4. The device of claim 1, wherein the electrodes each comprise a material selected from the group consisting of platinum, platinum alloy, gold, gold alloy, nickel, nickel alloy, palladium, palladium alloy, copper, copper alloy, silver, silver alloy, carbon and graphitic carbon.

5. The device of claim 1, wherein the electrolyte is impermeable to gases.

6. The device of claim 1, wherein the electrolyte is permeable to fluoride ions.

7. The device of claim 1, wherein the electrolyte is selected from the group consisting of PBSnF4, $LaF_3$ and doped $LaF_3$.

8. The device of claim 1, wherein the fluorine gas mixture comprises one at more gases selected from the group consisting of HF, $NF_3$, $F_2$, $CF_4$ and $SF_6$.

9. The device of claim 1, wherein the electrodes comprise fluid-tight seals on respective faces of the electrolyte.

10. The device of claim 1, wherein the electrolyte is deposited on a substrate.

11. The device of claim 1, wherein said solid electrolyte is capable of fluorine ion exchange without destroying the solid electrolyte.

12. The device of claim 11, wherein fluorine may be generated at the anode by transferring fluorine ions from cathode to anode through the solid electrolyte.

* * * * *